R. J. Clay,
Reading Blocks.

N° 78,361. Patented May 26, 1868.

Witnesses.
A. Sellers
E. S. Tracy

Inventor.
R. J. Clay

United States Patent Office.

ROBERT J. CLAY, OF FLUSHING, NEW YORK.

*Letters Patent No. 78,361, dated May 26, 1868.*

ALPHABET-TOY.

*The Schedule referred to in these Letters Patent and making part of the same.*

TO ALL WHOM IT MAY CONCERN:

Be it known that I, ROBERT J. CLAY, of Flushing, in the county of Queens, and State of New York, have invented a new and useful Alphabet-Toy, of which the following is a full, clear, and exact description, reference being had to the accompanying drawing, forming part of this specification, and in which—

Figure 1:
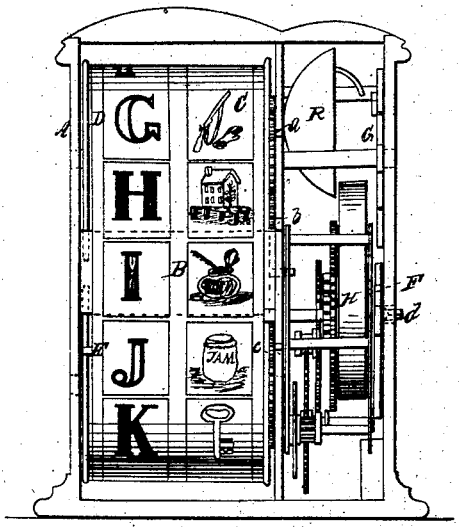

Figure 1 represents a front view of my improved toy, and

Figure 2:
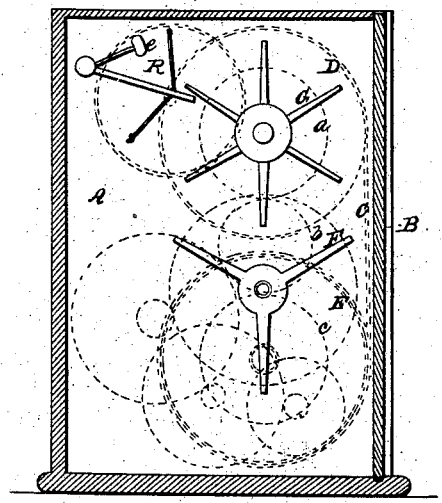

Figure 2 a vertical section, close to that side of the outer casing which contains the driving-mechanism.

Similar letters of reference indicate corresponding parts.

The toy which is the subject of this specification, consists in a combination of mechanism, including certain clock or watch-work, with bell-attachment, and pictorial or other alphabet-apron, all arranged within a stand or case, having a glazed or partially-glazed face, so as to present but one letter with its pictorial illustration at a time, said apron being moved at intervals by the clock-work, to expose in regular order or succession the different letters of the alphabet with their illustrations, and upon each exposure to sound the bell, the whole forming a pictorial revolving or travelling alphabet, of an automatic character, combining instruction with amusement, and arresting or fixing the attention of a child.

Referring to the accompanying drawing, A represents a stand, box, or case, having a glass front, B, which should be mainly darkened, or the front otherwise be only partially glazed or made transparent, so as to present to view but one letter at a time of a travelling alphabet, with its pictorial illustration, as shown for the letter I in fig. 1. This pictorial alphabet, C, is of belt or apron-form, fastened at its opposite ends to drums D E, which are geared together by spur-wheels, $a\ b\ c$, and the upper one of which is driven or rotated intermittently by or through wheels, F G, formed of radial arms or spokes, so pitched and arranged, or proportioned, as that the lower wheel, F, which is the driver, through ordinary or other suitable clock-work, H, moves, as it is rotated, the wheel G intermittently and at regular intervals, a sufficient distance or space to wind on the one drum D, and off from the other drum E, the alphabet C, so as to bring each letter in succession, with its accompanying illustration, in front of or before the transparent portion of the front, and there to remain exposed to view till the next movement, as produced by the spoke-wheel F G, takes place, and so on until the spring of the clock-work has run down, or alphabet spent itself, when, by winding up the spring, through key applied to the arbor $d$, the toy may be started anew, commencing by exposure of the first letter of the alphabet, and running through the latter as before.

To attract and fix the attention of the child as each fresh letter is exposed, and to contribute generally to the taking and useful character of the toy, I cause the wheel G, in addition to its duty as driver to the alphabet, by its gear with the wheel F, to perform the function of striker to a bell, R, by the spokes of said wheel G lifting or operating, as they pass it, a hammer, $e$, acted upon by a spring, as usual.

By the alphabet-belt or apron winding on one and unwinding from another drum, as described, a letter of large size may be made to present a straight exposure, without involving a large stand or case, thereby keeping the toy within a convenient handling size or compass, and so that it may be put with every facility or advantage to stand on a shelf or table.

What is here claimed, and desired to be secured by Letters Patent, is—

1. A travelling alphabet, preferably of pictorial character, operated automatically, by means of clock-work, within a stand or case, by causing the same to wind and unwind intermittently on and off drums, and so as to expose but a letter at a time, substantially as specified.

2. In combination with an intermittently travelling-alphabet apron, operated automatically as described, the bell R, struck to indicate the changes made in the exposure of the letters, essentially as herein set forth.

3. The combination of the alphabet-apron C, drums D E, spoke-driving wheels F G, bell R, with its hammer $e$, and clock or watch-work, all arranged within a stand or case, having a partially-transparent front, for operation as described.

R. J. CLAY.

Witnesses:
A. LE CLERC,
E. P. TRACY.